(12) United States Patent
Khosravy

(10) Patent No.: US 8,341,099 B2
(45) Date of Patent: Dec. 25, 2012

(54) SEMANTICS UPDATE AND ADAPTIVE INTERFACES IN CONNECTION WITH INFORMATION AS A SERVICE

(75) Inventor: Moe Khosravy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 12/781,963

(22) Filed: May 18, 2010

(65) Prior Publication Data

US 2011/0225107 A1     Sep. 15, 2011

Related U.S. Application Data

(60) Provisional application No. 61/313,186, filed on Mar. 12, 2010.

(51) Int. Cl.
  *G06F 15/18* (2006.01)
(52) U.S. Cl. ........................................................ 706/12
(58) Field of Classification Search ............... 706/12
  See application file for complete search history.

(56) References Cited

U.S. PATENT DOCUMENTS

| | | | |
|---|---|---|---|
| 6,311,194 B1 | 10/2001 | Sheth | |
| 6,785,704 B1 | 8/2004 | McCanne | |
| 6,826,553 B1 | 11/2004 | DaCosta | |
| 7,269,664 B2 | 9/2007 | Hutsch | |
| 7,502,770 B2 | 3/2009 | Hillis | |
| 7,653,640 B2 * | 1/2010 | Khosravy et al. | 707/999.1 |
| 7,756,825 B2 * | 7/2010 | Khosravy et al. | 707/611 |
| 7,890,646 B2 * | 2/2011 | Khosravy et al. | 709/231 |
| 8,078,749 B2 * | 12/2011 | Khosravy | 709/231 |
| 8,090,685 B2 * | 1/2012 | Clark et al. | 707/612 |
| 8,095,495 B2 * | 1/2012 | Clark et al. | 706/48 |
| 8,185,495 B2 * | 5/2012 | Clark et al. | 707/610 |
| 2005/0080776 A1 | 4/2005 | Colledge et al. | |
| 2007/0100800 A1 | 5/2007 | Rose et al. | |
| 2008/0082494 A1 | 4/2008 | Polo-Malouvier et al. | |
| 2008/0162498 A1 | 7/2008 | Omoigui | |
| 2009/0306961 A1 | 12/2009 | Li et al. | |

OTHER PUBLICATIONS

"Windows Azure Platform", Mar. 9, 2010, 3 pages.
"Open Data Protocol", 1 page.
"SWAD-europe Deliverable 4.2: Semantic Web and Web Services: RDF/XML and SOAP for Web Data Encoding", Published Date—Feb. 10, 2007, http://www.w3.org/2001/sw/Europe/reports/sw_soap_design_report/, 6 pages.
Youyong Zou, et al., "F-OWL: an Inference Engine for the Semantic Web 1", Published Date—2005, http://ebiquity.umbc.edu/_file_directory_/papers/128.pdf, 12 pages. Li Ding, et al., "Finding and Ranking Knowledge on the Semantic Web", Published Date—2005, http://www.springerlink.com/content/p6uq87m422nx3754/fulltext. pdf, 15 pages.
International Search Report for PCT Application Ser. No. PCT/US2011/028141 dated Oct. 27, 2011, 3 pages.

\* cited by examiner

*Primary Examiner* — Michael B Holmes

(57) ABSTRACT

Additional semantic information that describes data sets is inferred in response to a request for data from the data sets, e.g., in response to a query over the data sets, including analyzing a subset of results extracted based on the request for data to determine the additional semantic information. The additional semantic information can be verified by the publisher as correct, or satisfy correctness probabilistically. Mapping information based on the additional semantic information can be maintained and updated as the system learns additional semantic information (e.g., information about what a given column represents and data types represented), and the form of future data requests (e.g., URL based queries) can be updated to more closely correspond to the updated additional semantic information.

20 Claims, 14 Drawing Sheets

_US 8,341,099 B2_

SEMANTICS UPDATE AND ADAPTIVE INTERFACES IN CONNECTION WITH INFORMATION AS A SERVICE

CROSS-REFERENCE TO RELATED APPLICATIONS

This application claims priority to U.S. Provisional Application Ser. No. 61/313,186, filed on Mar. 12, 2010, entitled "SEMANTICS UPDATE AND ADAPTIVE INTERFACES IN CONNECTION WITH INFORMATION AS A SERVICE", the entirety of which is incorporated herein by reference.

TECHNICAL FIELD

The subject disclosure relates to updating of semantics and/or interfaces based on one or more inferences in response to querying over one or more data sets accessible via one or more networks.

BACKGROUND

By way of background concerning some conventional systems, computing devices have traditionally stored information and associated applications and data services locally to the device. Yet, with the evolution of on-line and cloud services, information is increasingly being moved to network providers who perform none, some or all of service on behalf of devices. The evolution of network storage farms capable of storing terabytes of data (with potential for petabytes, exabytes, etc. of data in the future) has created an opportunity to mimic the local scenario in a cloud, with separation of the primary device and the external storage.

However, no cloud service or network storage provider has been able to effectively provide information as a service on any platform, with publishers, developers, and consumers easily publishing, specializing applications for and consuming any kind of data, in a way that can be tracked and audited for all involved. In addition, due to the disparate number of content providers and their typically proprietary schemas for defining data, today, where disparate content providers do not coordinate their publishing acts to the cloud with one another, there is little opportunity to leverage the collective power of such disparate publishing acts. In effect, to the consuming audience of the publishing, such as subscribers or developers, two different data sets look like they have two different shapes, even where there may be some or substantial overlap of data or data types.

More specifically, currently, the way data is uploaded by different parties is such that a similar column of different data sets (e.g., both representing city), if even named at all, will have different names, which may or may not be similar. In either case, human intervention into the underlying data and verification is the conventional way to determine what columns should be named the same or similarly, or to otherwise determine what the relationship between the types or columns of data might be. In addition to being unscalable, such intervention in the underlying data may not be desirable to publishers who want to guarantee their data remains unaltered, as may be the case for a host of proprietary data sets that might be published to the cloud.

The above-described deficiencies of today's devices and data services are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In connection with information as a service from any platform, a variety of data sets can be stored in the cloud with programmatic access via query APIs, e.g., universal resource identifier (URI)-based querying. The APIs and semantics describing the data sets are adaptive as the system learns and self-describes its stored data as published in an evolving way as more and more queries are executed over the data providing additional opportunities to infer information about the data sets.

Additional semantic information that describes data sets can be inferred in response to a request for data from the data sets, e.g., in response to a query over the data sets, including analyzing a subset of results extracted based on the request for data to determine the additional semantic information. The additional semantic information can be verified by the publisher as correct, or satisfy correctness probabilistically. Mapping information based on the additional semantic information can be maintained and updated as the system learns additional semantic information (e.g., information about what a given column represents and data types represented), and the form of future data requests (e.g., URL based queries) can be updated to more closely correspond to the updated additional semantic information.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
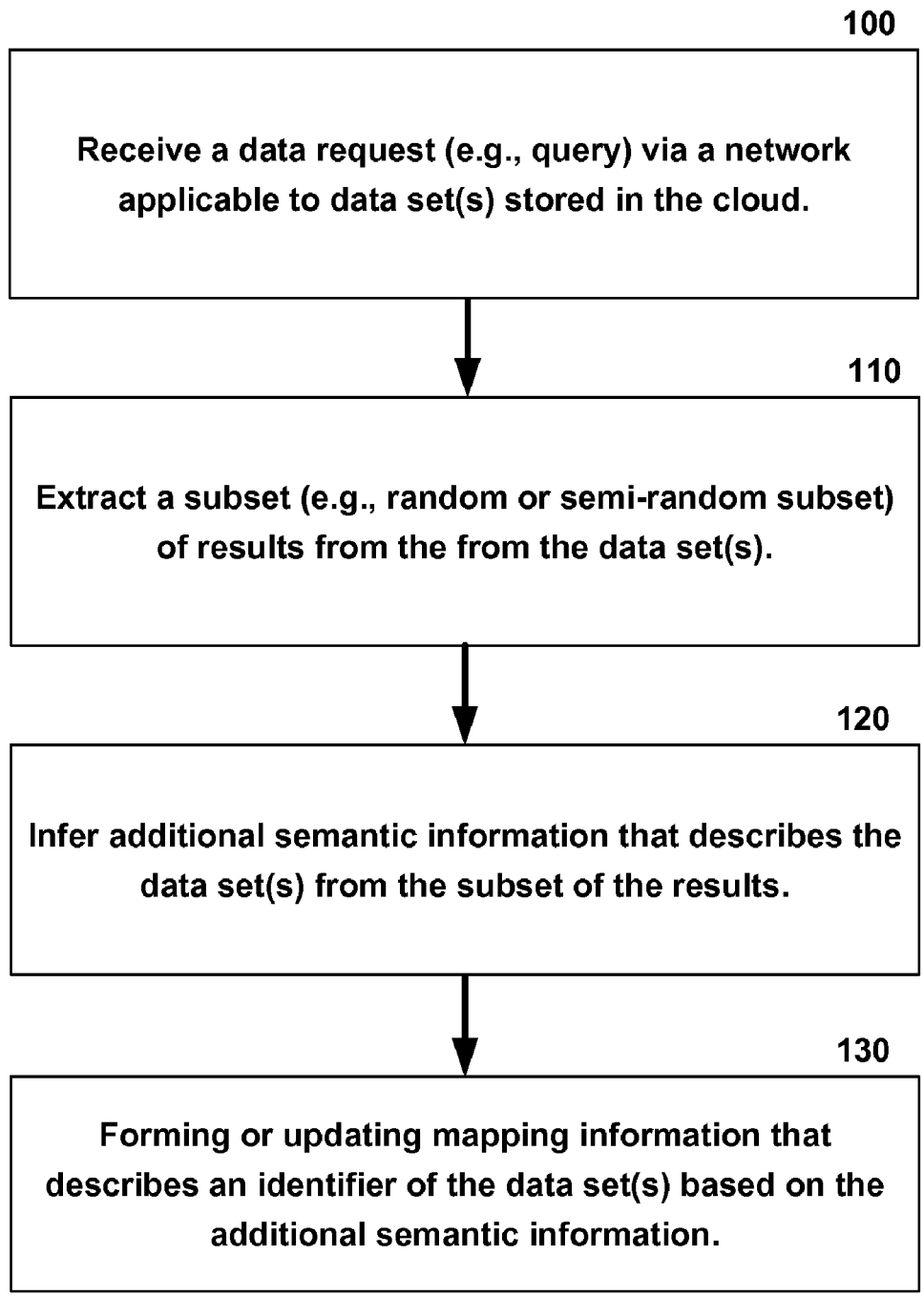
FIG. 1 is a flow diagram illustrating an exemplary non-limiting embodiment for updating mapping information associated with information provided as a service from any platform.

As discussed in the background, different content providers providing different data sets do not generally coordinate with respect to possible overlap of information or data type represented in their data sets since they generally have no knowledge of one another's data sets, or any particular incentive to do so. In an information service where one of the guarantees by the storage entity is non-interference with the underlying data sets after publishing, so that the data published remains unaltered, currently, there is no way to leverage the collective power of this on the developer or consumption side except through inside knowledge and the development of custom applications.

For instance, content provider A may publish a table including columns for latitude, longitude, with corresponding crime rate, e.g., column names of lat, long and cri_rate. Content provider B may publish movie theatre information for cities, with x and y coordinates corresponding to latitude and longitude, except the column for city may instead be called "Name", e.g., column names of _theatre, _Name, _x and _y. Accordingly, it is unknown by any conventional means on the consumption side that by joining the two sets, where the data itself cannot be examined on the storage side except without proper access permissions held by the publisher, one could actually determine the movie theatres in cities having the lowest crime rate, since the semantic meaning of the disparate columns remains abstruse.

It is thus desirable to determine that _x and _y are lat and long, that _Name means city name and that _theatre refers to movie theatre names. Then, one querying over the two data sets could join the tables in a sensible way according to an appropriate query to return useful data about crime rates near movie theatres—information that could not have been discerned without such information. While conventionally, this work can be done by hand by examining the data sets directly behind the scenes on the server side, where data is effectively not visible on the server side, e.g., because a developer can only perform certain types of queries over the data based on certain privileges, one is at a loss currently to perform such a correlative join.

Accordingly, in various non-limiting embodiments, based on developer actual (permitted) queries over data sets, the results of such queries, or results based on automatic queries based on such queries, can be examined or partially examined to make certain inferences about the data, and subsequently augment data sets with the learned semantic information to improve not only the potential for joins by providing mapping(s) between columns formerly thought to represent different data/types, but also the language used for queries can be updated based on such knowledge to make for more descriptive and logical queries. Accordingly, the language used for queries adapts to such inferences as well to make for clearer, more expressive and intuitive syntax for making such data requests. In this regard, in accordance with various embodiments, such network requests for information, e.g., queries, adaptively improve in terms of efficacy, ability to join, filter, merge, etc. and ease of use.

Further details of these and other various exemplary, non-limiting embodiments and scenarios are provided below.

Updating of Data Set Semantics and Access API(S) in Connection with Information as a Service As mentioned, in the context of information as a service, there are a finite number of things that may be represented in data sets (phone numbers, city codes, address, city, state, zip code, etc.) which can be inferred either the name of the column, or by weighted matching algorithms on the data itself (e.g., the 1st thousand things). For important data, while a human can be brought in to classify the data, for large amounts of data, such conventional human classification does not scale well, and if data is re-published by a publisher with different semantics, the human characterization may already be out of date.

Accordingly, in various embodiments, random samples resulting from querying a data set are analyzed to determine if the type of data can be inferred. For instance, a content provider provides a set of poorly described data, e.g., according to a proprietary schema. Based on or in response to a data request received over the data, a set of samples can be extracted from the data set for application of a set of algorithms to infer semantic meaning of the data, e.g., inferring data type or column name based on clues in the data or column name, or other column names. Since the publisher generally will not want his or her data that is published altered, a set of augmented semantics, e.g., mappings, can be maintained by the system to describe the inferences made by the system, e.g., _x=latitude for the earlier example. In this regard, as a result, the next developer is given more information about querying that data set, in which case more joins, filters, etc. can be performed with other data sets having a longitude column, and in addition, the access APIs themselves which previously included "_x( . . . )" as part of the syntax can be updated to "latitude( . . . )" making the access APIs self-descriptive over time to further aid developers. In one example, the query APIs are implemented via URLs, e.g., OData, more information about which can be found below.

In one embodiment, weighted algorithms based on known distributions of data, such as the age spread of a given population, can be used to determine probabilistically what a given set of data or column name represents, e.g., determine that a set of floating point numbers represents age.

In this way, without making it more difficult to publish data as is, certain conventions such as phone numbers and addresses can be enforced on the content providers through indirection, e.g., maintenance of semantic mappings. This way, content providers are encouraged to publish, but consumers still benefit from a sense of uniformity over the data. For instance, phone numbers are an example of numerical data that can be relatively easily identified as such, though variations such as area code parentheses, dashes, etc. exist. Standardizing this representation through semantic mappings based on inferences makes consumption of this data by developers and subscribers easier, in addition to adapting the access APIs over time to be more and more self-descriptive, e.g., re-naming a column "PN" as "phone numbers" or something else more descriptive.

In addition, the publisher can choose to participate as well. While the publisher is not required to participate, at upload time, the system can make inferences and ask the publisher to verify the inferences so that mapping information and descriptive access APIs can be exposed from the outset. For instance, as the system infers a publisher is uploading salary information, the system can ask the publisher if that is net salary or gross salary being represented.

The augmented semantics enables two smaller tables, which were previously uncorrelated, to be joined, merged, filtered, etc. where it is inferred that they contain similar tables, columns, data types, etc. despite initially disparate semantics.

A variety of algorithms can be used to infer information about semantics, e.g., weighted matching techniques can be employed, manual review of a subset of query results, community review of the subset of query results (e.g., like Wikipedia approval), assignment of data quality scores, shipping data for a column separately from the data. As mentioned, in addition to inferring what data represents, the data can be "cleaned up" as well. For instance, time is represented in many different formats, and it may be known that a given column represents time; however, converting such different formats to a universal time format has benefits in connection with cross data set operations. As discussed, phone numbers and addresses are another example of information that can be standardized across different representational formats.

Also, a subset of random samples can be taken out of actual result sets to make such inferences, and thus the system can improve over time as additional queries are made and the sample population becomes more numerous and diverse. The name of a column may be dispositive or informative as well, e.g., if a column is named citcode, the system in essence knows what is being represented. Any of or multiple of the above techniques can be applied hierarchically to infer such additional semantic information. In this regard, being able to achieve such semantic update through the mechanism of access API calls, instead of handling the problem purely by examining the data set as a whole as published by the publisher database problem, enables dynamic update as well as a system that becomes more accurately descriptive over time, within the syntax of the API calls themselves as they begin to reflect the learned information.

As discussed, data can be uploaded through URLs via open data protocol in connection with information as a service from any platform. Based on what consumers are requesting, inference of the data can be performed by checking the way the data is named and based on the actual data set that is returned. As a result, with the better name next time, the APIs (as represented by the URLs) are automatically updated so that next time the semantics of a query that said http://dallas/ . . . /_a(SEA) could better read http://dallas/ . . . /City (Seattle) next time. In other words, keep building logical semantics over the data as it is requested and processed through the URLs to not only determine mappings between columns, but to improve the semantics of the URL or access API more generally.

FIG. 1 is a flow diagram illustrating an exemplary non-limiting embodiment for updating mapping information associated with information provided as a service from any platform. At 100, a computing device in a first region of control receives a data request from a computing device in a second region of control via network. The data request, e.g., query, or for a more specific example, a URL based query, is applicable to one or more data sets published to and stored by the computing device in the first region of control. At 110, in response to the data request, a subset of results (e.g., random, or semi-random subset) are extracted from the one or more data sets based on the data request. The subset of results can be returned, or extracted, from the data request itself, or from a derivative data request executed in parallel, but based on the syntax of the data request.

At 120, additional semantic information that describes the one or more data set(s) is inferred from the subset of the results. The semantic information can include, but is not limited to, semantic information that describes a data type of the at least one data set or a relationship (e.g., a relationship between the data or type of data and a pre-defined category of data or type of data) between the subset and at least one pre-determined type of data. At 130, mapping information that describes an identifier (e.g. column name) of the one or more data sets are formed or updated based on the additional semantic information. Additionally, semantics associated with future data requests over the one or more data sets can also be updated based on the additional semantics information.

Figure 2:
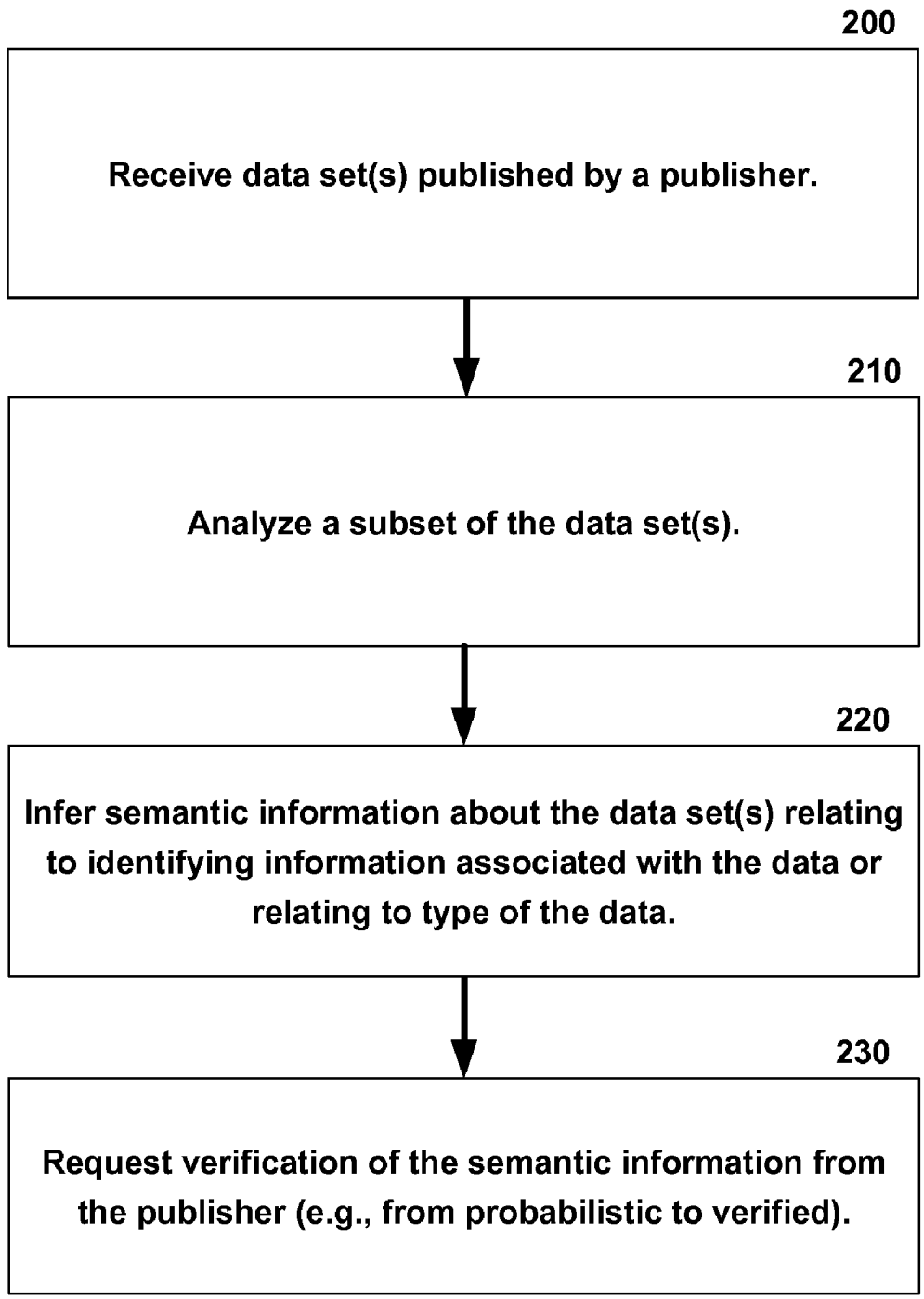
FIG. 2 is a flow diagram illustrating an exemplary non-limiting embodiment for requesting verification of inferred semantics of a publisher in connections with information provided as a service from any platform.

FIG. 2 is a flow diagram illustrating an exemplary non-limiting embodiment for requesting verification of inferred semantics of a publisher in connections with information provided as a service from any platform.

At 200, one or more data sets published by the publishing computing device are received by a receiving computing device in a first region of control from the publishing computing device in a second region of control. At 210, a subset of the one or more data sets is analyzed. Based on the analyzing, at 220, semantic information is inferred about the one or more data sets relating to identifying information associated with data of the one or more data sets or relating to type of the data of the one or more data sets. At 230, verification of the inferred semantic information can be requested of the publisher (e.g., the publishing computing device) to confirm that the semantic information inferred by the inferring is correct.

In various embodiments, in response to receiving the verification from the publisher, mapping information can be formed or updated that describes an identifier (e.g., column name) of the at least one data set based on the semantic information, or semantics associated with data requests (e.g., queries, or URL queries) over the one or more data sets based on the semantics information can be re-defined, or refined.

Figure 3:
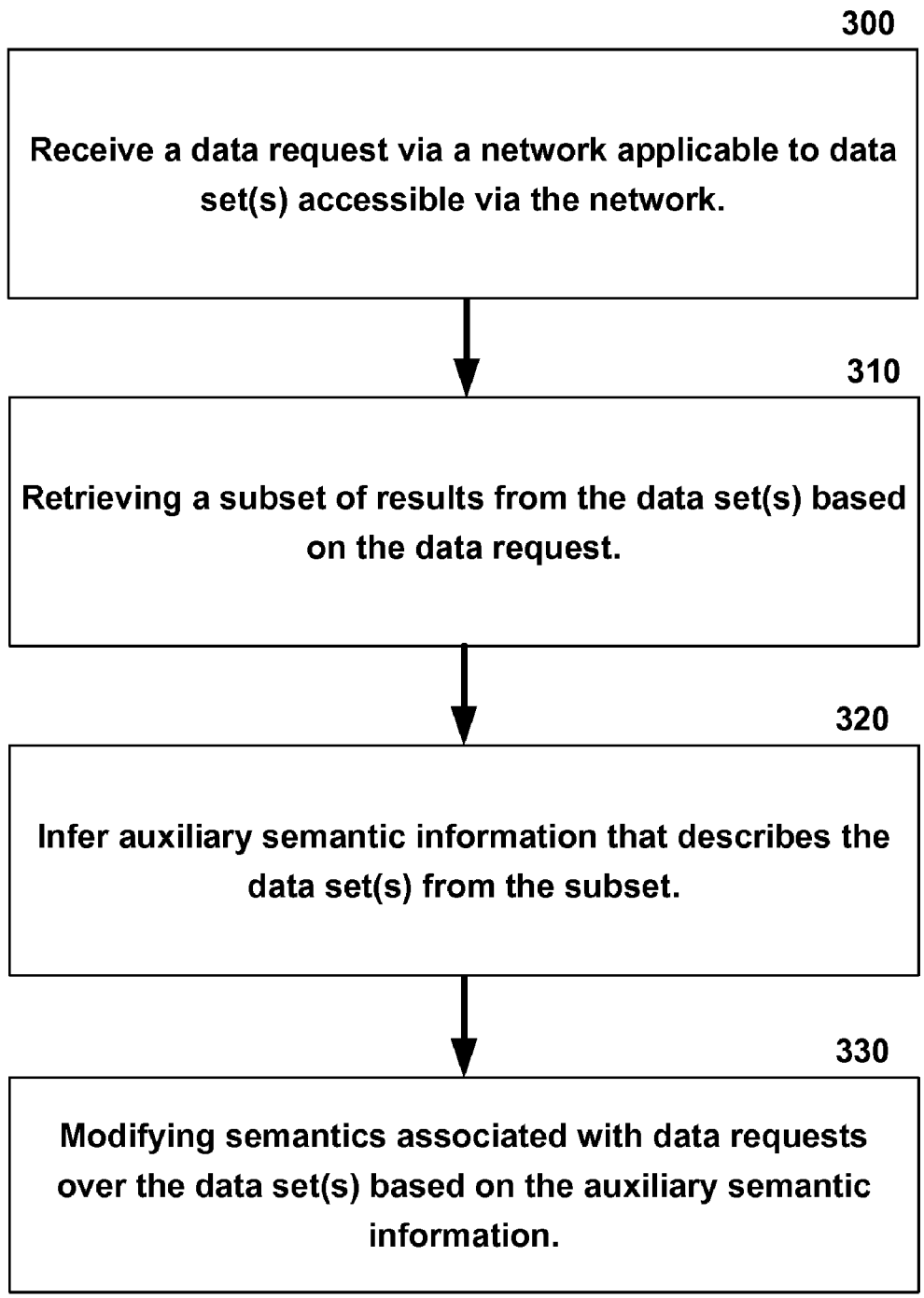
FIG. 3 is a flow diagram illustrating an exemplary non-limiting embodiment for updating data request APIs associated with information provided as a service from any platform.

FIG. 3 is a flow diagram illustrating an exemplary non-limiting embodiment for updating data request APIs associated with information provided as a service from any platform. At 300, a data request is received via a network applicable to data set(s) accessible via the network. At 310, a subset of the results from the data set(s) are retrieved based on the data request. At 320, auxiliary semantic information that describes the data set(s) are inferred from the subset. At 330, semantics associated with data requests over the data set(s) are modified based on the auxiliary semantic information.

For additional explanation regarding one or more embodiments, when information as a service from any platform is provided as a resource to publishers, to encourage upload of data, it is reasonable to expect the publishers to upload "ugly" data sets, i.e., data sets that don't adhere to any particular convention or standard, which may make them difficult to appreciate in terms of what they natively represent. In addition, when expectations of absolute confidentiality and integrity are expected for published content, it is also reasonable to expect publishers to want such conditions enforced except over auditable entities who query over the data in an authorized manner. In such case, the data cannot be analyzed on the back end for such semantic meaning, rather, the opportunity arises when an authorized query exposes results that are representative of the data content. In one non-limiting implementation, such queries are presented to the system via the open data protocol, further details of which are presented below. For instance, a developer or other authorized subscriber might query for information associated with cities in Seattle with the following URL: http://InfoasService/ . . . /city (Seattle). In this regard, in one or more embodiments, semantic information about the data is inferred by basing the inference on the API request results, or a subset thereof, and also based on the parameters of the URL/URI, such that a dynamic remapping can be handled from there based on the inferred information, creating a self-describing system over time—more queries, better inferences.

In one non-limiting embodiment, metadata is added to the column. For instance, initially, based on documentation, a developer may know to ask for Seattle from the "city" column. However, after 100 random samples are returned based on the particular query, it may be inferred that in fact "city" represents "West coast cities". In this respect, inferences are made regarding the kind of data, and logical semantics are built over time that are more accurate. For instance, in an example where initially a column labeled _A is inferred to represent city information, after further queries, the results excluding anything but West coast cities may lead to the characterization that _A refers to cities in West coast of USA. Accordingly, the semantics associated with such _A column improve over time when metadata regarding the West coast cities is ultimately added. In addition, the access APIs can be automatically updated based on the improved semantics. For instance, the query http://InfoasService/ . . . /_A(Seattle) evolves to http://InfoasService/ . . . /WestCoastCity (Seattle) and becomes more descriptive and intuitive (and thus more useful to the consumption side of information as a service) as a result.

In this regard, various embodiments provide adaptive APIs plus semantics of what a consumer of data, e.g., subscriber, developer, etc. are reviewing. The more that the data is used, the more the semantics of the APIs can be shaped, so that richer queries can be formed over tables that can be joined, filtered, etc. in new ways. The auxiliary data can be stored on top of or separate from the underlying published data, since as mentioned, it may be a requirement to the publisher that the custodian of the published data not alter the data. For instance, the system can create mappings between tables that are exposed to tables without ever altering any of the underlying data of the tables. Either the service side or the consuming side can perform such joins, merges, filters, etc., based on the inferences from the system.

In addition, once two data sets/tables are found to be related, an API can automatically be defined that joins the two data sets/tables. Accordingly, in one aspect, the system maintains a mapping of columns and in another aspect, the inferences as described above are automatically performed on a given data set based on the API calls. There is thus a level of indirection between data request and the data store. With a random sample result or pattern, a column type can be inferred without necessarily having access to the storage itself.

Figure 4:
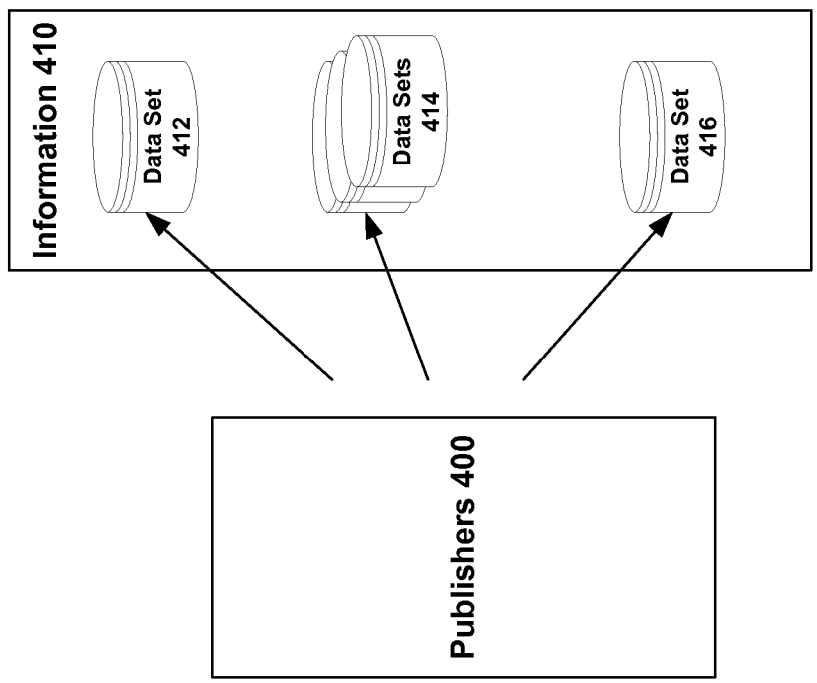
FIG. 4 is a block diagram illustrating an exemplary non-limiting act of publishing by publishers in connection with an embodiment of information provided as a service from any platform.

FIG. 4 is a block diagram illustrating an exemplary non-limiting act of publishing by publishers in connection with an embodiment of information provided as a service from any platform. FIGS. 5 to 8 build on the illustrative, but non-limiting example of FIG. 4, with like references referring to like elements, though it is noted such elements are merely illustrative and exemplary for purposes of explanation. As illustrated in FIG. 4, publishers 400 publish data to information as a service from any platform 410, essentially without restriction as to form; however, it may nonetheless be important to a given developer that the uploaded form is not altered. Thus, data set 412 stays unaltered, data sets 414 stay unaltered, data set 416 stays unaltered, and so on.

Figure 5:
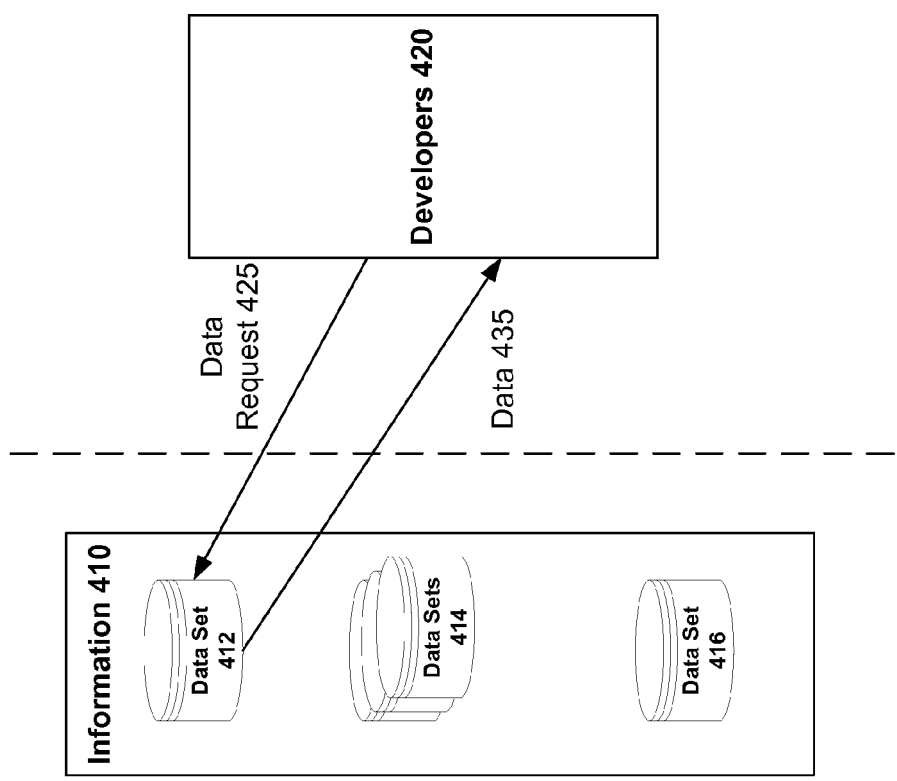
FIG. 5 is a block diagram illustrating an exemplary non-limiting act of developers or other consumers requesting data from the published data sets in connection with an embodiment of information provided as a service from any platform.

FIG. 5 is a block diagram illustrating an exemplary non-limiting act of developers or other consumers requesting data from the published data sets. In this regard, once published, information 410 can be consumed in a variety of ways by developers 420 or other subscribers via published APIs. In one embodiment, this is achieved through a URL based query specification, however, any protocol for making a data request 425 can be adopted. In this regard, based on data request 425, typically, data results 435, e.g., result sets are returned.

Figure 6:
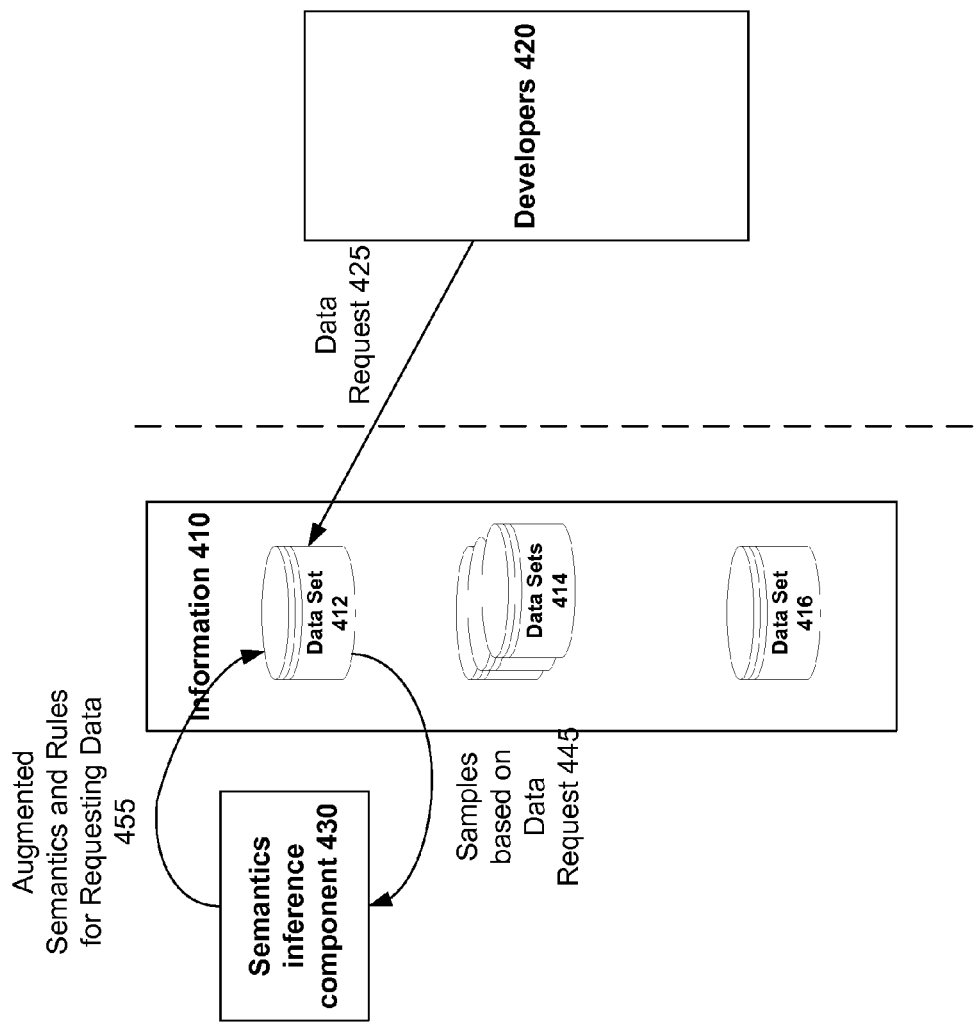
FIG. 6 is a block diagram illustrating an exemplary non-limiting act of inferring semantic information in response to a data request in connection with an embodiment of information provided as a service from any platform.

FIG. 6 is a block diagram illustrating an exemplary non-limiting act of inferring semantic information in response to a data request. In this regard, in addition to, or prior to returning results 435 of FIG. 5, FIG. 6 shows that a semantics inference component 430 can operate on sample results 445 based on the data request 425. The output of inference component 430 can be augmented semantic information describing pertinent information from information 410 and updated rules for making future data requests 455 which are improved in terms of descriptive or intuitive usage. Updated semantics and rules 455 can be carried out separately as well.

Figure 7:
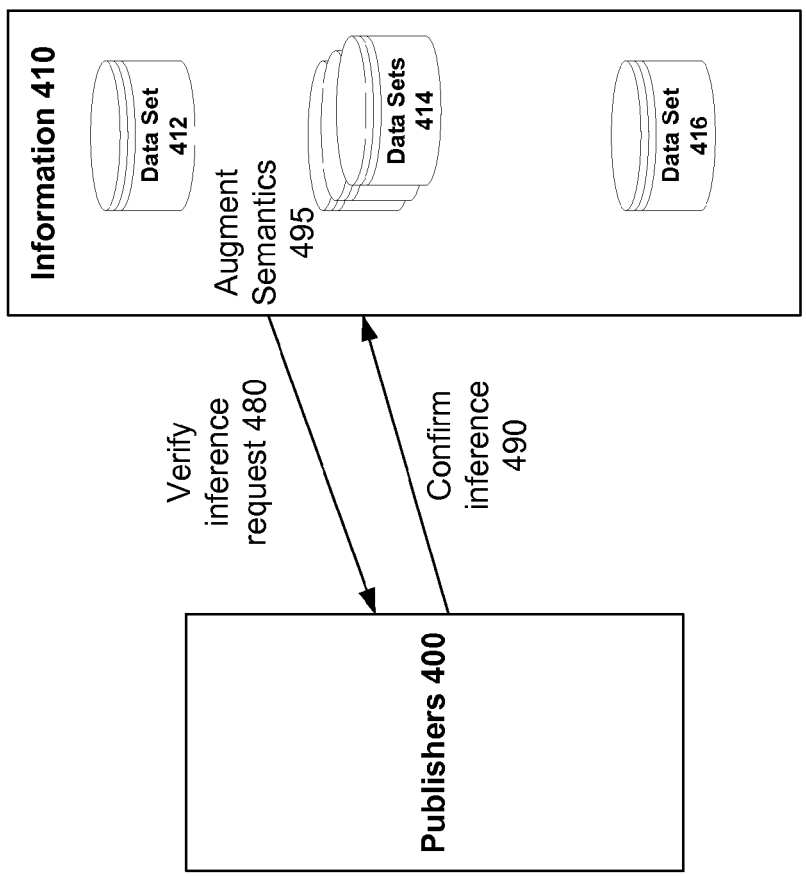
FIG. 7 is a block diagram illustrating an exemplary non-limiting act of verifying inferred information by publishers in connection with an embodiment of information provided as a service from any platform.

FIG. 7 is a block diagram illustrating an exemplary non-limiting act of verifying inferred information by publishers. In one embodiment, once auxiliary semantics are determined, a verify inference request 480 can be sent to the pertinent publishing entity of the publishers 400. For instance, if the publishing entity confirms the inference 490, then the semantics can be updated on top of the relevant published data set.

Figure 8:
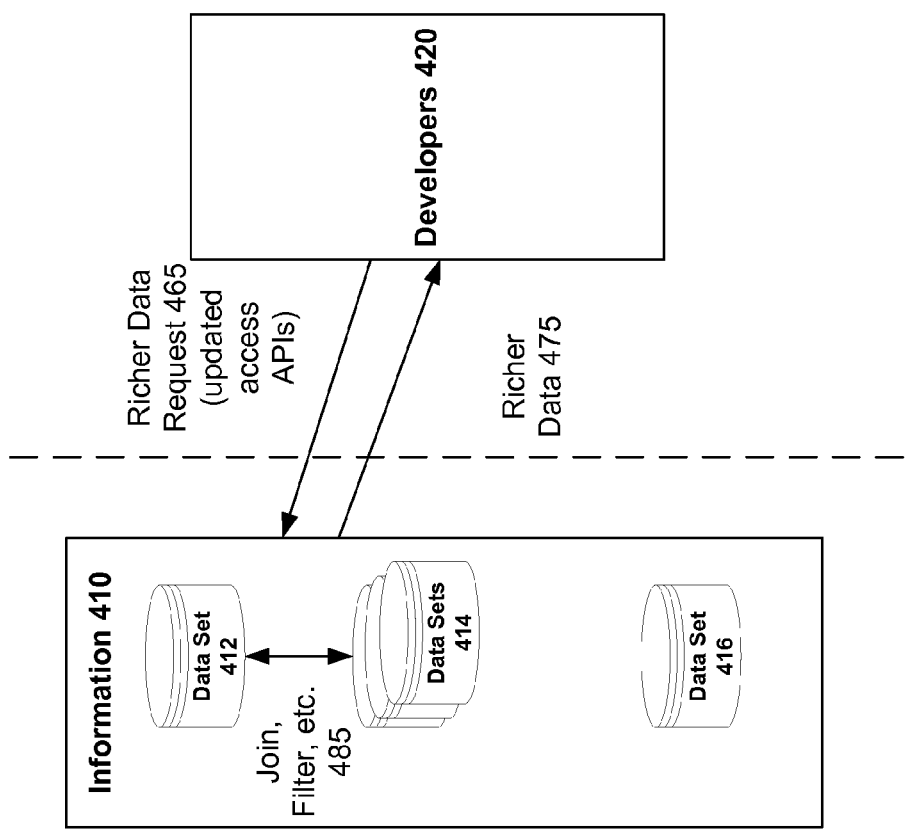
FIG. 8 is a block diagram illustrating an exemplary non-limiting act of richer future data request based on automatically updated access APIs in connection with an embodiment of information provided as a service from any platform.

FIG. 8 is a block diagram illustrating an exemplary non-limiting act of richer future data request based on automatically updated access APIs. In addition to providing auxiliary semantics by the inference engine, as mentioned, the access APIs themselves can also be improved. With richer data requests 465 and improved data set semantics, previously unrelated data sets can be related through join, filter, merge, operations that provide a greater pool of data for queries. Over time, the power of geometric or exponential merging of tables is powerful in terms of creating a strong centralized (and massive) body of knowledge describing everything from soup to nuts, against which queries can be run and correlative engines can discover new potentially useful things about humanity. As an example of the potential power of the inference tool on the consumption or data analysis side of information as a service from any platform, since previously uncorrelated items may end up becoming potentially correlated due to the power of the inferences, it is possible that in the health context, two diseases might be discovered as being correlated, resulting in a common cure effort.

Self-description over time, i.e., as the next query comes in and forms another set of rules, results in a set of adaptive query APIs. As mentioned, the inferences that take place can occur according to a set of hierarchical ways for inferring the data that is self-describing over time, e.g., a hierarchy of attempts at making inferences, from analysis of data type, to weighted matching/mapping techniques, to analysis of column names, to analysis of publisher type, to human intervention where all else fails, and so on and so on, establishing a hierarchical order for how to infer what the sample query results represent.

Supplemental Context for Information as a Service

The following description contains supplemental context regarding potential non-limiting infrastructure, architectures and/or associated services to further aid in understanding one or more of the above embodiments. Any one or more of any additional features described in this section can be accommodated in any one or more of the embodiments described above with respect to updating of data set semantics and corresponding access APIs for information as a service from any platform. While such combinations of embodiments or features are possible, for the avoidance of doubt, no embodiments set forth in the subject disclosure should be considered limiting on any other embodiments described herein.

By way of some additional background, today, while information can be obtained over networks, such as the Internet, today's offerings tend to the proprietary in terms of access and framework, and are thus limited in terms of third party provider participation. For instance, currently, there is no adequate business model for commercial content providers to publish their data in a way that does not relinquish at least some of the value of such commercial content, and thus historically, owners of valuable content have tended to expose that content through limited proprietary means. Or, in instances where storage of such content is provided by secure cloud storage providers, there is little value in storage alone when a consumer must wade through thousands of tables to potentially find an item of interest. In addition, even where cloud storage providers attempt to collect data from various providers, at best such providers can boast a modest, small or incomplete catalog of data.

Much of the stunting of potential growth in this area has been the result of mistrust over handling and IP (e.g., copyrights). In short, big players don't trust cloud providers with crown jewels because a single compromise can end the value of the data. In addition, such cloud providers to date have had a weak position with respect to information workers who wish to extract value from such data for their informational needs, and in addition, due to the proprietary nature of such systems, developers have thus far had limited ability to expand tools for developing informational capabilities.

Accordingly, as described for one or more embodiments, an infrastructure for information as a service is provided that accommodates all classes of individuals: publishers, developers, information workers, and consumers. The infrastructure enables information discovery, e.g., the ability to discover, acquire, and consume structured and blob datasets to power any application—on any platform and any form factor (e.g., any screen size). The infrastructure further enables brokerage business, e.g., a partner driven ecosystem and global reach to deliver data and functionality to developers and information workers. The infrastructure also allows analytics and reporting, e.g., a single click analysis to augment private data with public data. In this regard, due to the open nature of various implementations of the infrastructure, any application developer can develop mobile, cloud, and/or desktop applications to facilitate the publishing, processing, querying and/or retrieval of data.

To write applications, one can register for account information (e.g., sign in with Live ID) and be provided with an account key by which to access the "blob" via structured and real-time web services enabled for the infrastructure for information as a service as described for one or more embodiments herein. In one aspect, developers can explore the APIs visually before coding begins. For instance, a service explorer module or set of modules can be used by developers to visually construct representational state transfer (REST) API queries and preview the content according to a variety of packages, such as, but not limited to extensible markup language (XML), ATOM, RAW (for blob and real-time content), or in a table view (e.g., for structured data). For example, a developer merely provides his or her account key and selects to preview the content.

Accordingly, developers can build mobile, desktop or service applications on any platform. While resulting REST queries can be copied into a new developer application, the infrastructure for information as a service also enables the ability to consume automatically generated C# proxy classes to eliminate any need to create a local object model or generate and understand the details of XML or web service code. In this regard, in another non-limiting beneficial aspect, a developer can download the proxy classes and include them in the developer's applications to consume service data with as few as a couple lines of code.

In this regard, the various embodiments of an infrastructure for information as a service allow developers and information workers to find, acquire, and consume data in their applications and analytics scenarios instantly, periodically, or over some other function of time specified by the application developer. As mentioned, a developer obtains an account key which then accompanies web services calls to the network services enabling information as a service as described for one or more embodiments herein for content requests and subscribing to the content of interest.

Thus, in one aspect, the account key provided by the infrastructure for information as a service as described for one or more embodiments herein is the developer's private key. This key enables billing and reporting on content used in connection with the developer's applications. As such, this private developer key should not be shared without purpose, and precautions in securing the key should be taken where developing native applications running on mobile or desktop solutions and planning to integrate the key as part of the deployment. For example, cryptographic storage can be used to ensure the key is not cracked.

In addition to the account key, which is used to track the application consuming the content, the unique user ID is a globally unique identifier (GUID) that represents the developer's individual users. This field allows billing for content that is priced on a per-user basis programmatically. For example, if a developer is developing a mobile application with an individual user consuming the application, the developer should return the same GUID each time requests are made on behalf of that individual user. However, if the developer is developing a web portal and issuing web service requests on behalf of a variety of users, it is up to the developer to assign a new GUID for each unique user visiting the portal. For example, each registered user can be assigned a GUID or each IP address/port combination assigned a unique user ID GUID, etc.

While REST APIs can be constructed on any platform to consume content from the infrastructure for information as a service as described for one or more embodiments herein, in one embodiment, proxy classes can be dynamically generated for services in C#. Achieving this is a matter of downloading the object models, adding them to the current developer project, and updating the account and unique user values.

If a developer would like to issue requests manually, an example is provided below, but for any service, the preview function can be used, or the URLs created from the Service Explorer can be invoked as well. An exemplary, non-limiting REST query to a sample dataset is illustrated below. It is noted that some or all calls can be secure socket layer (SSL) secured.

https://api.sqlazureservices.com/UnService.svc/UNESCO(120)

The $accountKey and $uniqueUserId elements are also placed in the header of the request, which appears as follows, for example:

$accountKey={developer account key}
$uniqueUserID={a GUID representing the unique user}

The value in $accountKey represents the developer's account key, found in the Accounts Tab and the value in $uniqueUserID represents the GUID for the unique user accessing the service.

Accordingly, the infrastructure for information as a service as described for one or more embodiments herein is a new service or framework allowing developers and information workers to easily discover, purchase, and manage premium data subscriptions in any platform. The infrastructure is an information marketplace that brings data, imagery, and real-time web services from leading commercial data providers and authoritative public data sources, as well as non-authoritative publishers, together into a single or multiple locations that are unified under a common provisioning and billing framework. Additionally, developers and information workers can consume this premium content with virtually any platform, application or business workflow.

Some exemplary, non-limiting scenarios for using the infrastructure for information as a service as described for one or more embodiments herein include: (a) finding premium content to next-generation "killer apps" for consumer and business scenarios, (b) discovering and licensing valuable data to improve existing applications or reports, (c) bringing disparate data sets together in innovative ways to gain new insight into business performance and processes, e.g., aggregation algorithms, (d) instantly and visually exploring APIs across all content providers for blob, structured, and real-time web services and (e) consuming third party data inside existing applications and data base systems, such as existing word processing, spreadsheet, database query systems, etc., for rich reporting and analytics.

Benefits for developers include: (a) trial subscriptions allow content to be investigated and applications to be developed without paying data royalties, (b) simple transaction and subscription models allow "pay as you go or grow" access to multi-million dollar datasets, (c) consistent REST based APIs across datasets facilitate development on any platform, (d) visually building and exploring APIs, previewing results and (e) automatic C# proxy classes provide instant object models and eliminate the need to write tedious XML and web service code.

Benefits for Information Workers include: (a) integration with PowerPivot to easily work with data in existing spreadsheet software such as, but not limited to, Excel, (b) simple, predictable licensing models for acquiring content and (c) the ability to consume data from SQL Server, SQL Azure Database, and other pre-existing assets.

Benefits for Content Partners include: (a) easy publication and on-boarding process regardless of blob data, structured data, or dynamic web services, (b) developer tooling on the selected platform to ease development, e.g., via Visual Studio and .NET or other runtime system development, (c) exposing developer content to global developer and information worker community, (d) content discovery and integration inside pre-existing content consumption applications and (e) a scalable cloud computing platform handles storage, delivery, billing, and reporting on behalf of all parties.

In a non-limiting implementation of the infrastructure for information as a service as described for one or more embodiments herein, some features for Rich Web Services include: (a) secure, REST based model for consuming services across the entire content catalog, (b) dynamic pagination built into the APIs to simplify access, (c) Standard ATOM 1.0 feeds are available for most of the services and (d) consistent billing, provisioning, and usage reporting across all services.

In a non-limiting implementation of the infrastructure for information as a service as described for one or more embodiments herein, some features for a Service Explorer component include: (a) C# proxy classes generated to simplify development, (b) preview of data in tabular form and as a feed, such as an ATOM 1.0 feed, if supported, (c) invocation of the service to understand the results that the compiled service call returns, (d) discovery of documentation and sample values for each of the parameters and (e) instant copying of the visually built URL for a service call into clipboard to ease development.

In a non-limiting implementation of the infrastructure for information as a service as described for one or more embodiments herein, some features for a Marketplace Integration and Discovery Portal component include: (a) discovery of new data across domains including consumers and businesses, (b) management of service subscriptions and usage limits, (c) management of account keys to access the services and (d) detailed access reporting containing the services/datasets that were accessed, grouped by date and by account key.

The infrastructure provides a variety of value propositions for content owners, application developers/ISVs and for information workers and other consumers/subscribers. For content owners, the infrastructure enables monetization from data (for data providers who charge for the data), in addition to social benefits for data providers who do not charge for data, but derive benefit from the publication of such data in other ways. Due to the openness of the infrastructure, content owners enjoy greater availability and reach of data to ISVs and consumers/information workers, and all of this comes at a lower cost, particularly over developing a proprietary model as in the past.

For application developers/ISVs, the infrastructure enables access to data in a consistent format, variable and low-cost pricing model for data access. predictable pricing, profit potential from consumers/IWs using the applications built using the data, broader reach to consumers through any platform and a single billing and data source.

For information workers/consumers, the infrastructure enables added value from applications, consumption of data in current large object (LOB) or IW software, a variable and low-cost pricing model for data access in addition to a single billing and data source.

Accordingly, the infrastructure solves a current customer and developer pain point with a potentially significant revenue upside, creates unique business intelligence opportunities attached with instant data for modeling, reporting, analysis and trending and creates adoption and stickiness for any platform by encouraging data owners to store their data via the infrastructure, thereby differentiating the infrastructure's value proposition when compared with conventional cloud storage environments.

Figure 9:
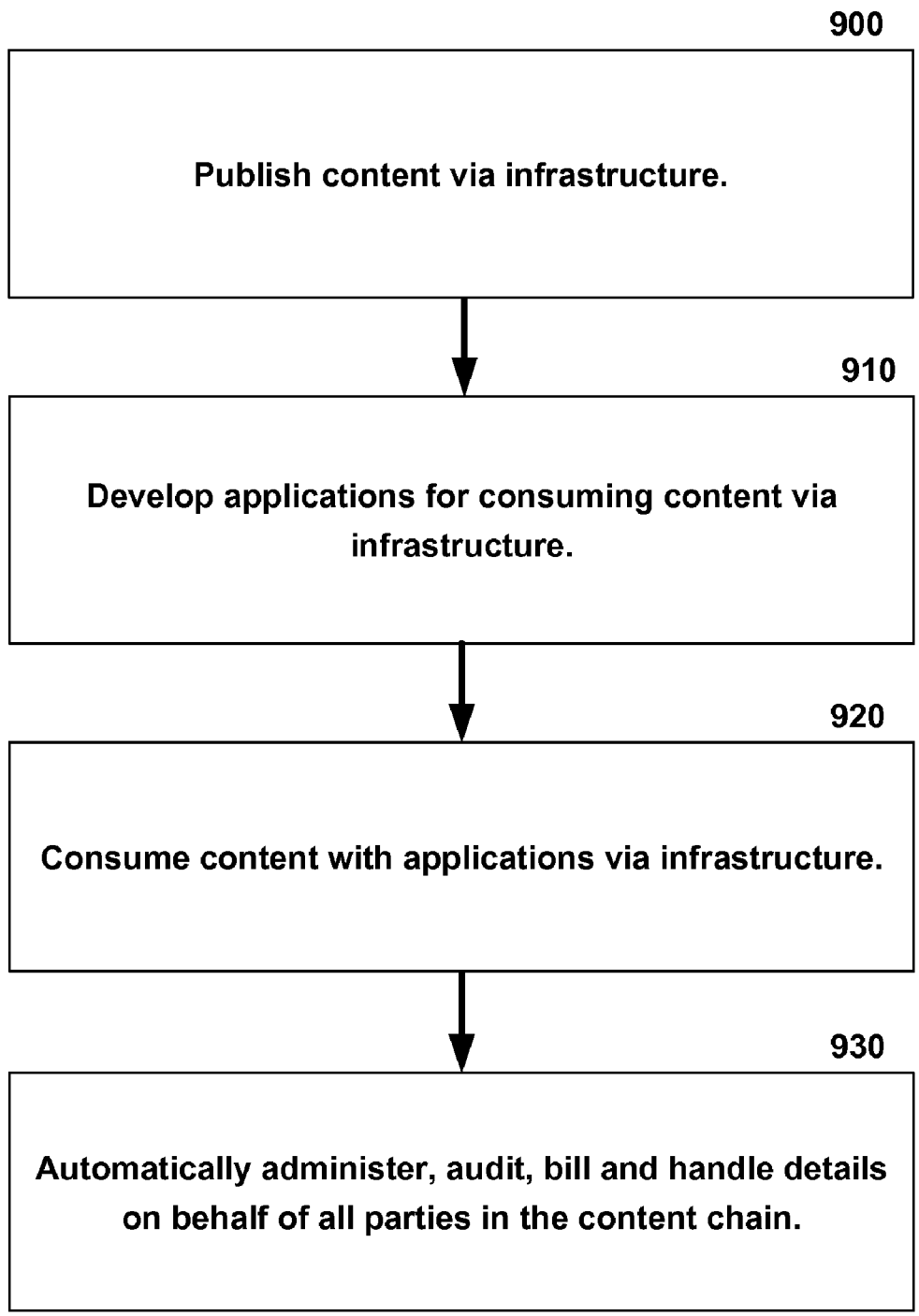
FIG. 9 is a flow diagram illustrating an exemplary sequence for a non-limiting infrastructure for information provided as a service from any platform.

As shown in the flow diagram of FIG. 9, at 900, described herein are various ways for content owners or publishers to publish data via the infrastructure. At 910, there are a variety of tools that allow developers to developer applications for consuming the data via the infrastructure. At 920, consumers or information workers use the applications or can directly query over the data to consume the data. Lastly, the infrastructure provides a rich variety of tools at 930 that enable automatic administration, auditing, billing, etc. on behalf of all parties in the content chain, enabled by the transaction model.

In this regard, some key parties in the infrastructure include data owners, the application developers/ISVs and the consumers/information workers. In general, data owners are entities who want to charge for data, or who want to provide data for free for other reasons, or enforce other conditions over the data. In turn, application developers/ISVs are entities who want to monetize their application (e.g., through advertising, direct payments, indirect payments, etc.), or provide their application for free for some beneficial reason to such entities. Information workers and consumers are those who can use the raw data, or those who want to use an application provided by the application developers.

Figure 10:
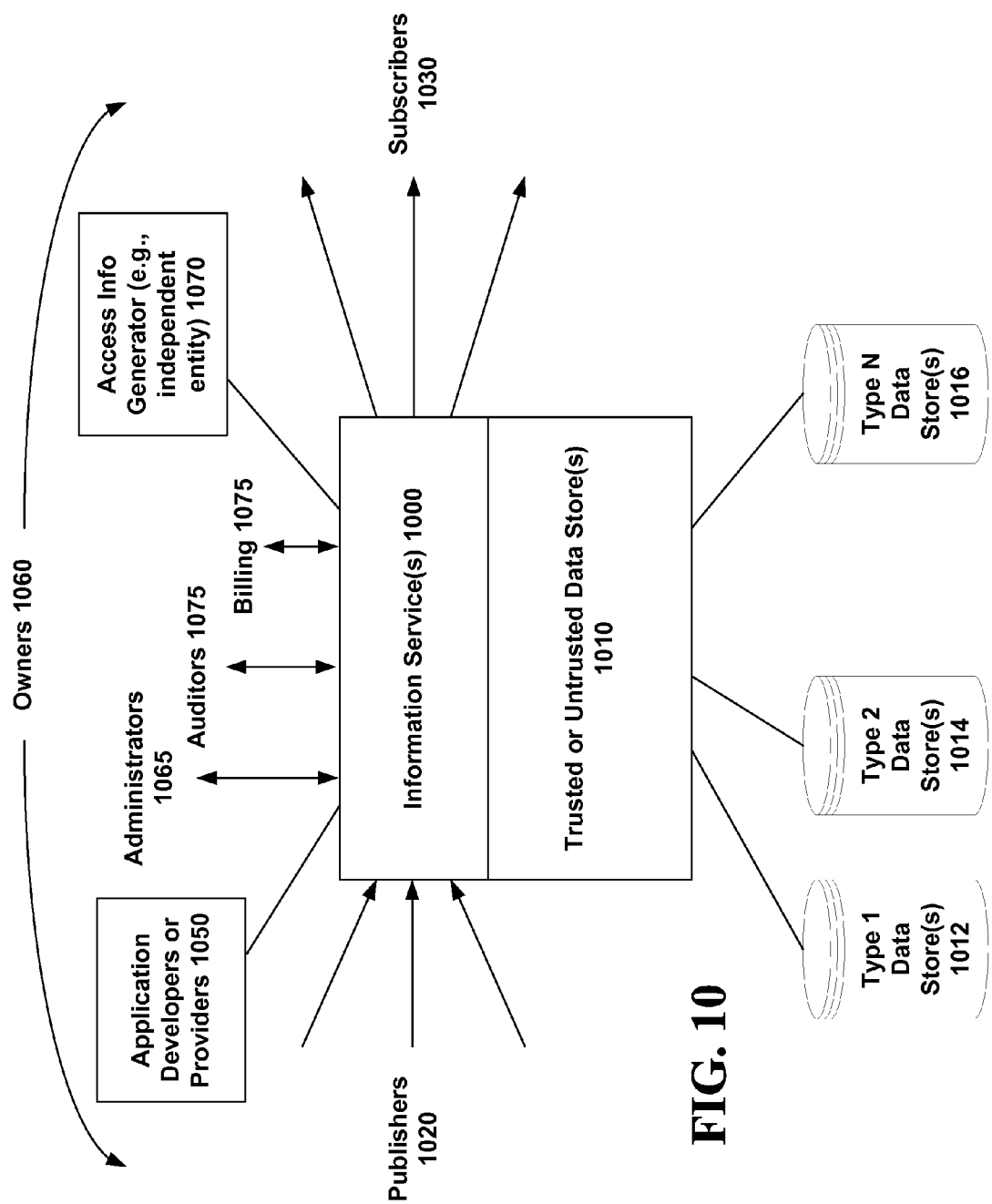
FIG. 10 is a block diagram illustrating an exemplary non-limiting infrastructure for information provided as a service from any platform.

FIG. 10 is a block diagram generally illustrating the various parties that may participate in an ecosystem providing information as a service as described herein. For instance a set of network accessible information services 1000 provide access to a variety of trusted or untrusted data stores 1010, depending on the sensitivity or other characteristics of the data. As shown, thus, what type of data store, 1012, 1014, . . . , 1016 is not so important since the ecosystem supports any kind of data, blob, structured, unstructured, etc. As mentioned, the system includes publishers 1020 that add data to the ecosystem, subscribers 1030 that consume the data and application developers or providers 1050 who help consumption of the data with their applications. An access information generator 1070 can also govern access to the data by various parties through maintaining or enforcing account information, key information, etc. In this respect, content owners 1060 can span any of the roles in that a content owner 1060 can be a publisher 1020, a subscriber 1030 and/or an application developer as well. In one aspect, the common infrastructure for all parties enables administration 1065, auditing 1075, billing 1075 as well as other desired ancillary services to the data transactions occurring across the infrastructure.

In this regard, various embodiments for the user friendly data platform for enabling information as a service from any platform is an infrastructure to enable consumers of data (IWs, developers, ISVs) and consumers of data to transact in a simple, cost effective and convenient manner. The infrastructure democratizes premium (private) and community (public) data in an affordable way to allow IWs to draw insights rapidly, allows developers to build innovative apps using multiple sources of data in a creative manner and enables developers to monetize their efforts on any platform. For instance, the infrastructure supports Pay Per Use as well as Subscription Pricing for Content, Pay for Content ("retail price"—set by content owner), Pay Data Fee ("Shipping and Handling") and BW, and further supports Data fees as a brokerage fee on a per-logical transaction basis (per report, per API, per download, etc.).

For Information Workers (e.g., Office, SQL Server, Dynamics users), the infrastructure supports subscriptions to allow for future EA integration as well as predictable spend requirements (as well as caching to support on and off-premise BI as well as "HPC" workloads). Thus, alternatives include content priced per-user per-month; which may or may not bundle to deliver content packs or per-transaction pricing, e.g., allowing cloud reporting/business intelligence on-demand pricing to eliminate the need to move large amounts of data while allowing per-usage pricing, or vertical apps via report galleries.

For content providers (any data type; any cloud), using any platform, the infrastructure becomes a value proposition to incent sales within any particular desired platform; auto-scaling, higher level SLA possibilities at no additional cost. For some non-limiting examples, data can be secure and associated data in the following domains: Location aware services & data, Commercial and residential real estate, Financial data and services, etc. A non-limiting scenario may include delivery of data to top 30 non-governmental organization (NGO) datasets. In addition, the infrastructure may include the ability to showcase BI & visualization through "Bing for information as a service", HPC, etc. Vertical application opportunities exist as well.

In one non-limiting embodiment, the data brokerage can be analogized to conventional brick and mortar strategies: For instance, capacity can be represented as shelf space (e.g., a mix of structured and unstructured/blob data), cost of goods (COGS) can be represented as square footage, (SA, platform dependency, bandwidth) and content can be represented as merchandise (e.g., optimize content providers to cover COGS, maximize profits from IWs and developers). In various embodiments, an onboarding process can be implemented with quality bars for data and services, as well as accommodation of service level agreements (SLAs).

Figure 11:
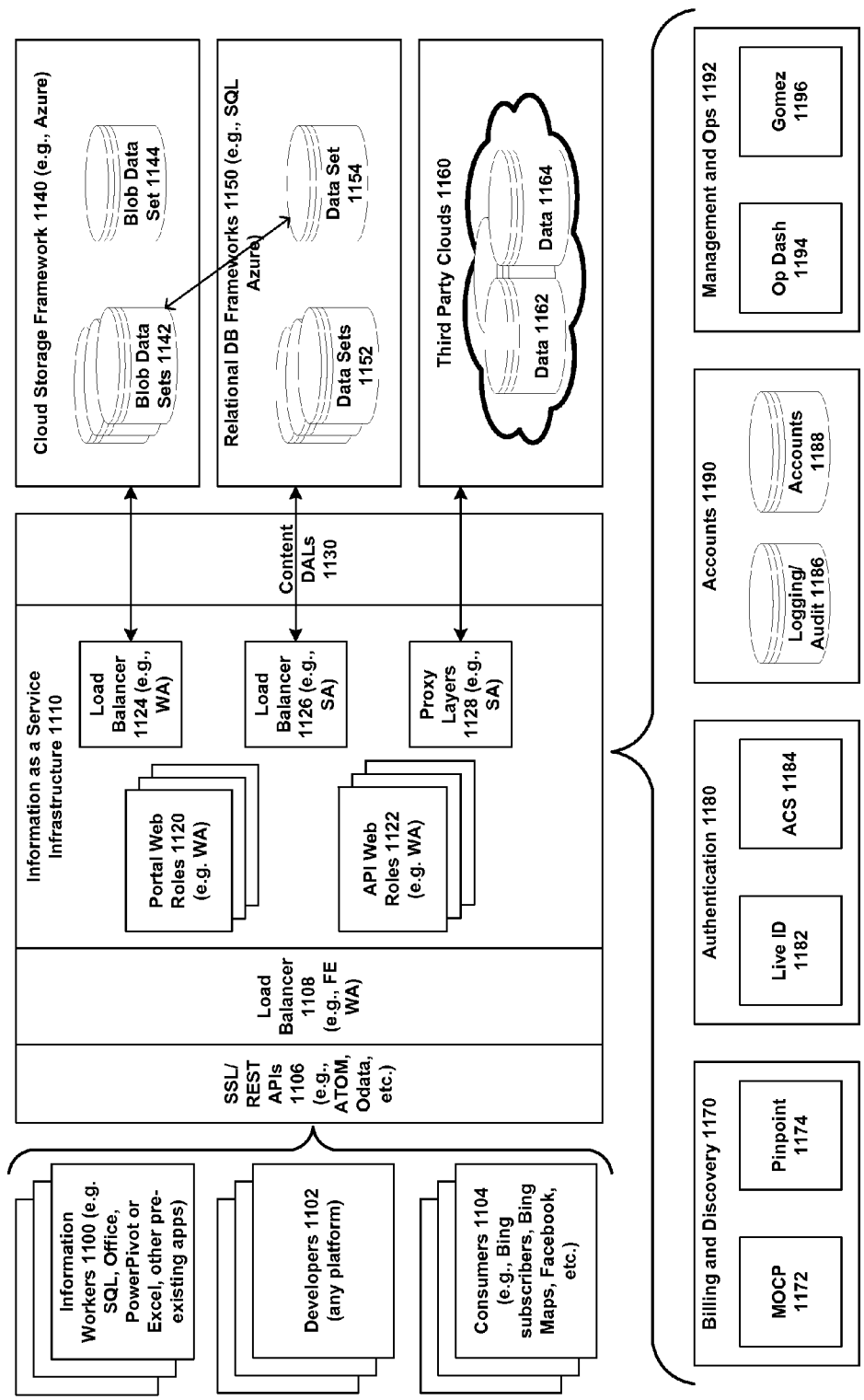
FIG. 11 is a block diagram illustrating an exemplary non-limiting set of implementation specific details for an infrastructure for information provided as a service from any platform.

FIG. 11 is an exemplary non-limiting implementation of the infrastructure 1110 for information as a service as described above according to one or more features. At the interaction side are information workers 1100, developers 1102 and consumers 1104 who can communicate with the infrastructure via SSL/REST based APIs 1106. A load balancer 1108 can be used to help steer traffic in an optimal way. In this regard, the input is routed to portal web roles 1120 or API web roles 1122. From the infrastructure 1110 to the data side is additional load balancing 1124 or 1126 (e.g., WA or SA) for access to blob data sets 1142, or blob data set 1155 of cloud storage framework 1140, or to data sets 1152 or data set 1154 of relational database frameworks 1150. Proxy layers 1128 can be used to access data 1162 or data 1164 of third party clouds 1160. Content data abstract layers (DALs) 1130 can be used to access content, where applicable. In this regard, there can be duplication or overlap of data sets across different types of storage, e.g., the same data might be represented as blob data and as structured data, e.g., SQL.

As supplemental services to the data, billing and discovery services 1170 can include online billing 1172 (e.g., MOCP) or discovery services 1174 (e.g., pinpoint) and authentication services 1180 can include credentials management 1182 (e.g., Live ID) or content authentication 1184, e.g., authenticated content services (ACS). Accounts services 1190 can include logging/audit services 1186 or account management 1188. Management and operations services 1192 can include an operations dashboard service 1194 and network operations service 1196, e.g., Gomez.

Figure 12:
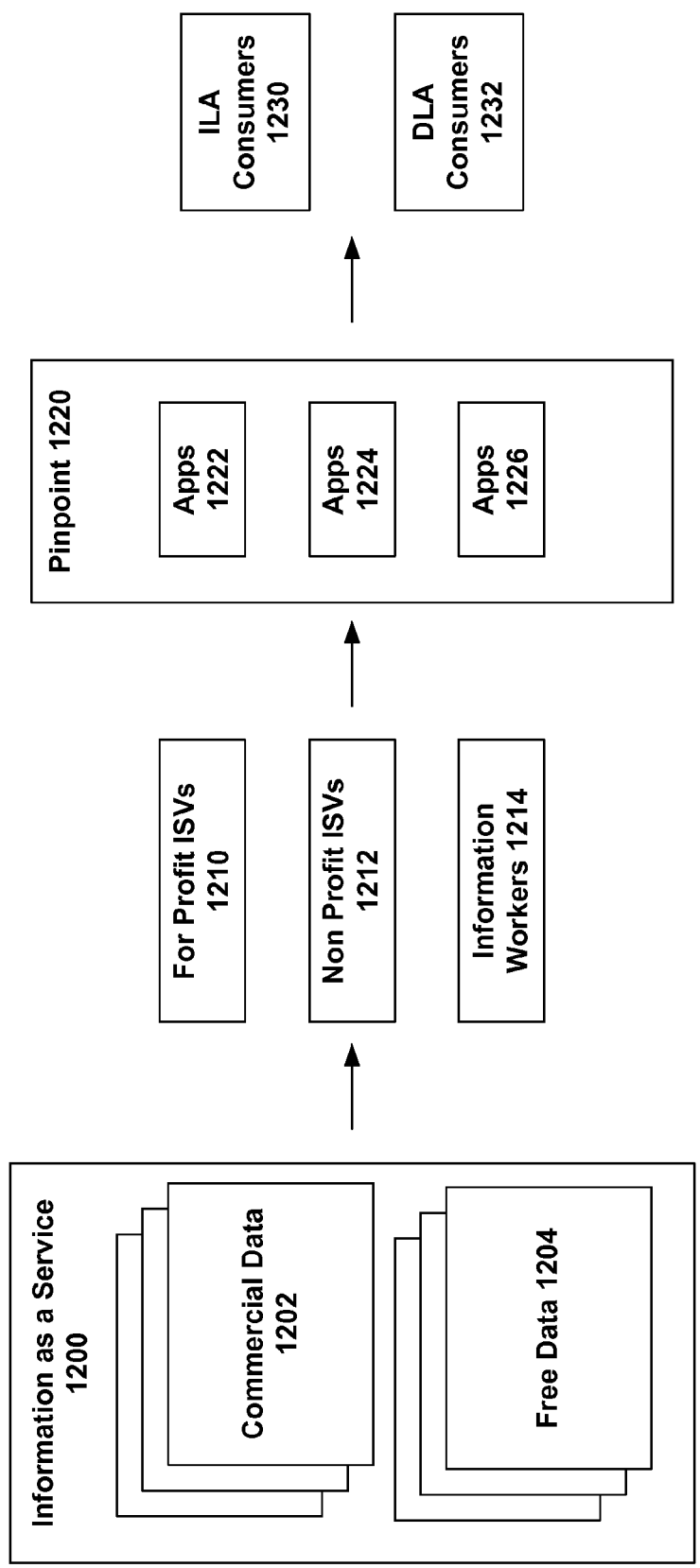
FIG. 12 is illustrative of exemplary consumption of data from an exemplary infrastructure for information provided as a service from any platform.

FIG. 12 is a block diagram illustrating an exemplary end to end flow from data to consumers of the data in accordance with one or more embodiments of the general infrastructure for enabling information as a service. For instance, information as a service 1200 can include commercial data 1202 and free data 1204, which can be of interest to various for profit developers 1210, nonprofit developers 1212 with non-profit motives and other information workers 1214 who are interested in consuming the data generally for productive goals. These entities can use discovery services 1220 to determine what applications 1222, 1224, . . . , 1226 may be of interest to them, and to ultimately transmit the data to ILA consumers 1230 and DLA consumers 1232 alike.

The Open Data Protocol

Those skilled in the art will appreciate that network interactions and information services may be practiced with a variety of computer system configurations and protocols. In this regard, one non-limiting implementation for querying and updating data that can be used in one or more embodiments described herein is the Open Data Protocol (OData).

OData is a web protocol for querying and updating data. OData applies web technologies such as HyperText Transfer Protocol (HTTP), Atom Publishing Protocol (AtomPub) and JavaScript Object Notation (JSON) to provide access to information from a variety of applications, services, and stores. For some general background, OData emerged organically based on the experiences implementing AtomPub clients and servers in a variety of products over the past several years. OData can be used to expose and access information from a variety of sources, including, but not limited to, relational databases, file systems, content management systems, and traditional web sites. OData has been released under the Open Specification Promise (OSP) to allow anyone to freely interoperate with OData implementations, in order to encourage growth of the ecosystem. Features of OData can be incorporated into other protocols as well to form hybrid protocols with similar functionality for querying and updating network data.

OData is consistent with the way the web works. In one aspect, OData uses universal resource identifiers (URIs) as a way to identify resources and uses an HTTP-centric protocol with a uniform interface for interacting with those resources, e.g., similar to the way that the Internet works. In one non-limiting aspect, OData builds on the conventions over HTTP popularized by AtomPub, which have simplified the process of sharing data, content and information across independently developed systems. OData defines additional conventions that implementations may optionally implement to support basic query and schema information to be exchanged. To simplify integration with HTML and JavaScript clients, OData defines an optional JSON representation of the protocol that complements the XML-based AtomPub format. As one can appreciate, additional implementation specific or other details regarding the OData protocol can be found at www.odata.org.

Exemplary Networked and Distributed Environments

One of ordinary skill in the art can appreciate that the various embodiments of methods and devices for an infrastructure for information as a service from any platform and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 13:
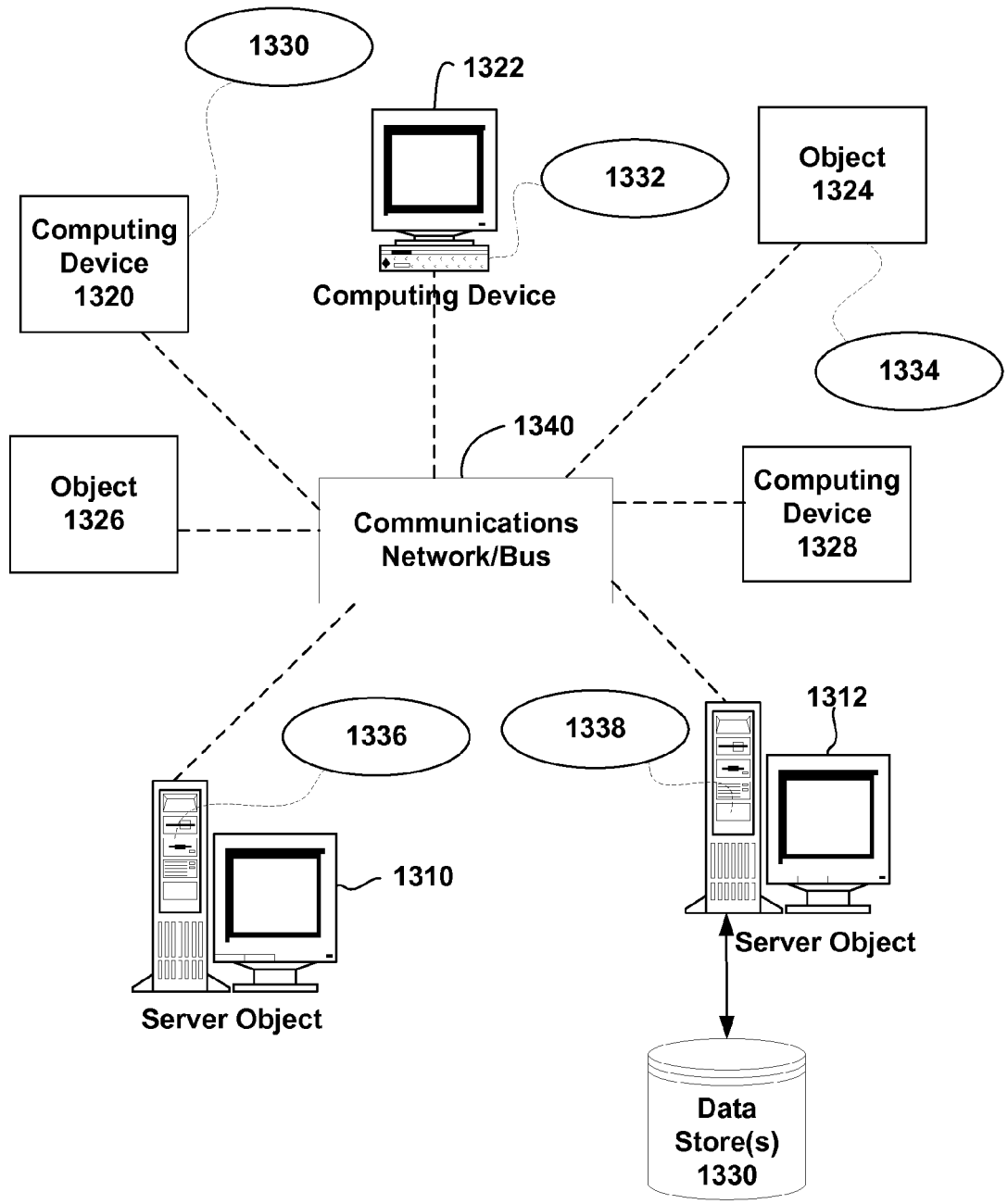
FIG. 13 is a block diagram representing exemplary non-limiting networked environments in which various embodiments described herein can be implemented.

FIG. 13 provides a non-limiting schematic diagram of an exemplary networked or distributed computing environment. The distributed computing environment comprises computing objects or devices 1310, 1312, etc. and computing objects or devices 1320, 1322, 1324, 1326, 1328, etc., which may include programs, methods, data stores, programmable logic, etc., as represented by applications 1330, 1332, 1334, 1336, 1338. It can be appreciated that computing objects or devices 1310, 1312, etc. and computing objects or devices 1320, 1322, 1324, 1326, 1328, etc. may comprise different devices, such as PDAs, audio/video devices, mobile phones, MP3 players, laptops, etc.

Each computing object or device 1310, 1312, etc. and computing objects or devices 1320, 1322, 1324, 1326, 1328, etc. can communicate with one or more other computing objects or devices 1310, 1312, etc. and computing objects or devices 1320, 1322, 1324, 1326, 1328, etc. by way of the communications network 1340, either directly or indirectly. Even though illustrated as a single element in FIG. 13, network 1340 may comprise other computing objects and computing devices that provide services to the system of FIG. 13, and/or may represent multiple interconnected networks, which are not shown. Each computing object or device 1310, 1312, etc. or 1320, 1322, 1324, 1326, 1328, etc. can also contain an application, such as applications 1330, 1332, 1334, 1336, 1338, that might make use of an API, or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 13, as a non-limiting example, computing objects or devices 1320, 1322, 1324, 1326, 1328, etc. can be thought of as clients and computing objects or devices 1310, 1312, etc. can be thought of as servers where computing objects or devices 1310, 1312, etc. provide data services, such as receiving data from computing objects or devices 1320, 1322, 1324, 1326, 1328, etc., storing of data, processing of data, transmitting data to computing objects or devices 1320, 1322, 1324, 1326, 1328, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1340 is the Internet, for example, the computing objects or devices 1310, 1312, etc. can be Web servers with which the computing objects or devices 1320, 1322, 1324, 1326, 1328, etc. communicate via any of a number of known protocols, such as HTTP. As mentioned, computing objects or devices 1310, 1312, etc. may also serve as computing objects or devices 1320, 1322, 1324, 1326, 1328, etc., or vice versa, as may be characteristic of a distributed computing environment.

Exemplary Computing Device

As mentioned, various embodiments described herein apply to any device wherein it may be desirable to implement one or pieces of an infrastructure for information as a service from any platform. It should be understood, therefore, that handheld, portable and other computing devices and computing objects of all kinds are contemplated for use in connection with the various embodiments described herein, i.e., anywhere that a device may provide some functionality in connection with an infrastructure for information as a service from any platform. Accordingly, the below general purpose remote computer described below in FIG. 14 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 14:
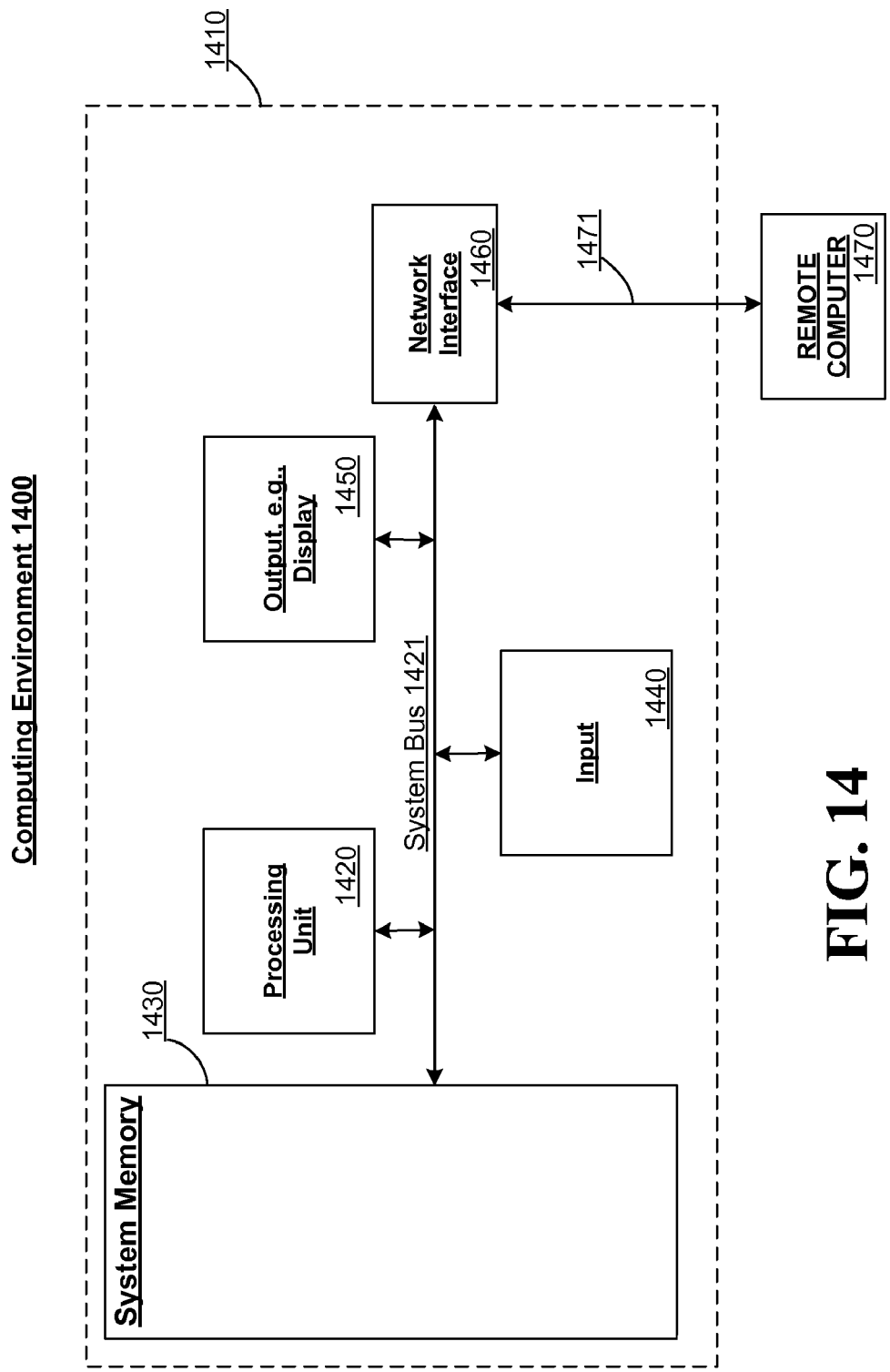
FIG. 14 is a block diagram representing an exemplary non-limiting computing system or operating environment in which one or more aspects of various embodiments described herein can be implemented.

FIG. 14 thus illustrates an example of a suitable computing system environment 1400 in which one or more of the embodiments may be implemented, although as made clear above, the computing system environment 1400 is only one example of a suitable computing environment and is not intended to suggest any limitation as to the scope of use or functionality of any of the embodiments. Neither should the computing environment 1400 be interpreted as having any dependency or requirement relating to any one or combination of components illustrated in the exemplary operating environment 1400.

With reference to FIG. 14, an exemplary remote device for implementing one or more embodiments herein can include a general purpose computing device in the form of a handheld computer 1410. Components of handheld computer 1410 may include, but are not limited to, a processing unit 1420, a system memory 1430, and a system bus 1421 that couples various system components including the system memory to the processing unit 1420.

Computer 1410 typically includes a variety of computer readable media and can be any available media that can be accessed by computer 1410. The system memory 1430 may include computer storage media in the form of volatile and/or nonvolatile memory such as read only memory (ROM) and/or random access memory (RAM). By way of example, and not limitation, memory 1430 may also include an operating system, application programs, other program modules, and program data.

A user may enter commands and information into the computer 1410 through input devices 1440 A monitor or other type of display device is also connected to the system bus 1421 via an interface, such as output interface 1450. In addition to a monitor, computers may also include other peripheral output devices such as speakers and a printer, which may be connected through output interface 1450.

The computer 1410 may operate in a networked or distributed environment using logical connections to one or more other remote computers, such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1471, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates provision of an infrastructure for information as a service from any platform in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for hosting data, comprising:
receiving, by at least one computing device in a first region of control from at least one computing device in a second region of control via at least one network, a data request applicable to at least one data set stored by the at least one computing device in the first region of control;
in response to the data request, extracting a subset of results from the at least one data set based on the data request;
inferring from the subset of the results additional semantic information that describes the at least one data set; and
forming or updating mapping information that describes an identifier of the at least one data set based on the additional semantic information.

2. The method according to claim 1, further comprising updating semantics associated with future data requests over the at least one data set based on the additional semantics information.

3. The method according to claim 1, wherein the forming or the updating includes forming or updating at least one column name of the at least one data set based on the additional semantic information.

4. The method according to claim 1, wherein the receiving includes receiving a query applicable to at least one structure data set.

5. The method according to claim 4, wherein the receiving includes receiving a universal resource identifier (URI) or universal resource locator (URL) representative of the query.

6. The method according to claim 1, wherein the extracting includes extracting the subset of results returned from executing the data request.

7. The method according to claim 1, wherein the extracting includes randomly or semi-randomly extracting the subset of results returned from executing the data request.

8. The method according to claim 1, wherein the extracting includes extracting the subset of results returned from executing at least one data request derived from the data request.

9. The method according to claim 1, wherein the inferring includes inferring from the subset of the results semantic information that describes a data type of the at least one data set.

10. The method according to claim 1, wherein the inferring includes inferring from the subset of the results semantic information that describes a relationship between the subset and at least one pre-determined type of data.

11. The method according to claim 1, wherein the inferring includes inferring from the subset of the results semantic information that describes a relationship between the subset and at least one pre-determined category of type of data.

12. A method for publishing data, comprising:
receiving, by at least one receiving computing device in a first region of control from at least one publishing computing device in a second region of control, at least one data set published by the at least one publishing computing device;
analyzing a subset of the at least one data set and inferring semantic information about the at least one data set relating to identifying information associated with data of the at least one data set or relating to type of the data of the at least one data set; and
requesting verification from the at least one publishing computing device that the semantic information inferred by the inferring is correct.

13. The method of claim 12, further comprising:
in response to receiving the verification, forming or updating mapping information that describes an identifier of the at least one data set based on the semantic information.

14. The method of claim 12, further comprising:
in response to receiving the verification, forming or updating mapping information that describes a column of at least one structure data set based on the semantic information.

15. The method of claim 12, further comprising:
in response to receiving the verification, further comprising re-defining semantics associated with data requests over the at least one data set based on the semantics information.

16. The method of claim 12, further comprising:
in response to receiving the verification, further comprising re-defining semantics associated with queries over the at least one data set based on the semantics information.

17. The method of claim 12, further comprising:
in response to receiving the verification, further comprising re-defining semantics associated with queries implemented via at least one universal resource identifier (URI) or universal resource locator (URL) based on the semantics information.

18. A method for hosting data, comprising:
receiving, by at least one computing device in a first region of control from at least one computing device in a second region of control via at least one network, a data request applicable to at least one data set stored by the at least one computing device in the first region of control;
in response to the data request, retrieving a subset of results from the at least one data set based on the data request;
inferring from the subset of the results auxiliary semantic information that describes the at least one data set; and
modifying semantics associated with data requests over the at least one data set based on the auxiliary semantics information.

19. The method according to claim 18, wherein the inferring includes inferring a data type of column based on at least one weight mapping algorithm.

20. The method according to claim 18, wherein the inferring includes probabilistic inferring of a type of data of the at least one data set based on a hierarchical set of inference algorithms for determining type.

* * * * *